3,151,156
PRODUCTION OF LOW BIURET, NON-CAKING UREA PRODUCT

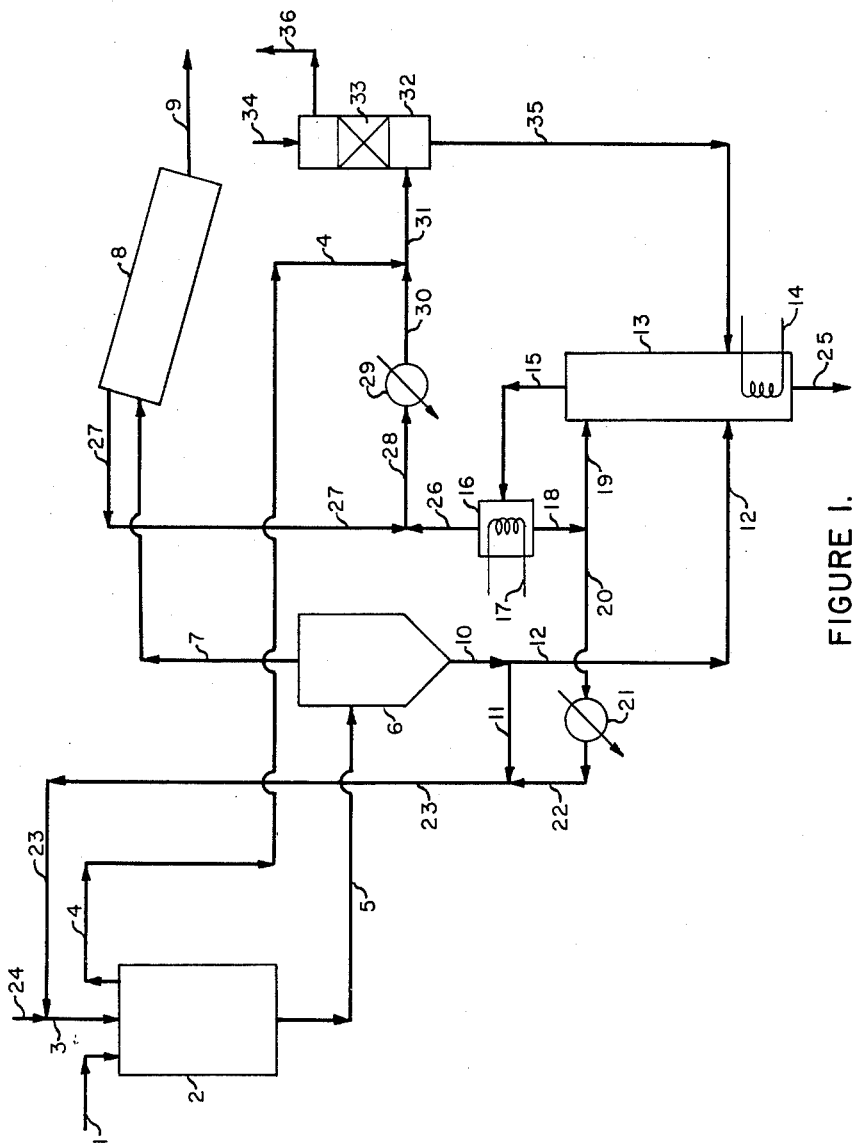

Jerome H. Marten, Nixon, and Abe Warshaw, Linden, N.J., assignors to Chemical Construction Corporation, New York, N.Y., a corporation of Delaware
Filed Dec. 22, 1961, Ser. No. 161,680
4 Claims. (Cl. 260—555)

This invention relates to a conditioning treatment for the production of an improved urea product characterized by reduced caking tendency and reduced biuret content. The present application is a continuation-in-part of co-pending U.S. patent application No. 79,163, filed December 29, 1960, now abandoned.

One of the principal problems involved in the use of urea as a bulk fertilizer involves its pronounced caking tendency. Thus, bulk shipment or storage of urea is seldom attempted except where climatic conditions are particularly favorable. In most cases, urea must be shipped in bags or other types of sealed containers, and in addition special solid forms of urea such as prills are generally preferred when the product is to be extensively handled. Other means of reducing the caking tendencies of urea such as the use of additives in the melt, or dusting the solid product with coating agents have also been widely employed.

The problem of biuret formation is also widely encountered in the production of urea. Biuret is a urea decomposition product which readily forms when urea is heated. The conventional urea synthesis processes produce an aqueous urea solution containing about 70% urea and 30% water. In order to produce solid urea product such as prills, the aqueous solution is concentrated to a urea melt containing less than 5% water in vacuum evaporators or other apparatus in which water is removed by heating. The melt is then prilled or processed by other means to produce solid urea product. However, the evaporative heating step, or retention of the urea melt at an elevated temperature for a time interval, causes a small portion of the urea to undergo decomposition or polymerization, thereby forming a variety of by-product impurities. A principal impurity, and one which is highly objectionable in certain urea usages, is biuret.

Urea is principally used as an agricultural fertilizer. One of the important techniques of such usage involves the dispersal of urea onto the foliage of growing plants or trees. In such usage, the presence of biuret in the urea produces highly adverse effects on the foliage. Consequently, a special grade of urea with very low biuret content is marketed for such usages. This urea is termed "foliar-grade," and is usually sold with a guaranteed maximum biuret content of 0.2%. Various methods have been developed for producing foliar-grade urea, principally involving special equipment and close temperature control, or partial crystallization of a standard grade of urea to produce pure crystals and leave the biuret in the residual liquid melt.

There are a variety of other usages in which low biuret content is required. Principal among these is the usage of urea in the production of synthetic plastics and resins. A small amount of urea is also consumed in pharmaceuticals, and here a stringent limitation as to content of biuret and other impurities is imposed.

In the present invention, the undesirable caking tendency and objectionable biuret content of crude solid urea are reduced or eliminated by treating the urea with a lower aliphatic ketone, principally those ketones having from 3 to 5 carbon atoms per molecule. In addition, any other soluble impurities, such as oils, free ammonia, ammonium salts, etc. are also removed from the urea. The treatment consists essentially of merely immersing the urea in liquid solvent bath containing one or more of these ketones. Other contact procedures may also be employed. For purposes of surface modification so as to reduce caking tendency, only a short contact interval of about 1 minute is necessary. For removal of biuret, a longer time interval may be required. The treated urea is then separated from the bath, and heated to vaporize occluded solvent. It has been found that lower aliphatic ketones such as acetone are highly selective solvents for biuret in the presence of urea, compared to other solvents. Thus the process of the present invention employs such ketones to purify urea essentially by selectively extracting biuret, using conventional extraction procedure and equipment. In this manner, foliar grade or technically pure urea is readily produced.

The process of the present invention has several major advantages as compared to prior techniques of biuret removal. Since relatively simple extraction and recovery equipment is employed, great flexibility is attained with respect to product purity and plant capacity. This may be contrasted to existing methods involving the use of such costly means as very close control of manufacturing processes or purification by re-crystallization of impure product. Another advantage of the present invention is that the impurity is completely removed from plant streams and obtained as a separate product. Prior methods such as partial crystallization result in the concentration of the biuret in other product streams. In addition, the process of the present invention has great flexibility. Thus, the process can be easily adapted to any existing method of urea manufacture and can utilize any type or purity of solid feed material. Finally, since it is not necessary to treat the entire plant production but instead only a side-stream of total plant output, it is possible to gear production to a great extent directly to sales, thus eliminating the need for costly inventory practices. With respect to the reduction of caking tendency, the advantages and improvement over prior techniques are fairly obvious. Thus, usage of coating agents is eliminated. In addition, substantial reduction in caking tendency is achieved, and in fact the test results indicate that the final product may be produced with substantially less caking tendency than the coated urea product of the prior art.

It is an object of the present invention to purify urea.

Another object is to remove biuret from urea.

A further object is to selectively extract biuret from urea, using a lower aliphatic ketone as the selective solvent.

An additional object is to produce substantially pure urea from impure urea containing biuret.

Still another object is to separate biuret from urea.

Still a further object is to reduce the caking tendency of solid urea.

An object is to produce a new physical form of solid urea, with modified surface crystalline structure and reduced caking tendency.

These and other objects and advantages of the present invention will become evident from the description which follows. Referring to FIGURE 1, a flowsheet of a typical process layout of the invention is presented. Thus, crude solid urea is passed via 1 into slurry mixing tank 2, which is provided with appropriate means for maintaining the solid urea in agitated contact with liquid. The treating liquid, which is a solution primarily consisting of a lower aliphatic ketone having from 3 to 5 carbon atoms per molecule, is passed into tank 2 via 3. The preferable ketone for the process of the present invention is acetone and therefore in the balance of the process description infra the solvent will be designated as acetone. It will be evident from data tables infra that other lower aliphatic ketones are equivalently useful in the process of the present invention.

The solid urea stream 1 is maintained in agitated contact with acetone stream 3 for a length of time which is dependent on the desired process result. That is, if only surface modification leading to decreased caking tendency is desired, then the residence time of the components in tank 1 may be as little as 1 minute. In order to extract a significant proportion of biuret from the urea, somewhat longer residence times of 30 to 60 minutes may be required. Thus in some cases tank 1 may in reality consist of a plurality of tanks, with slurry transfer between tanks to attain the desired residence time. The tank 1 is provided with vapor venting means, whereby acetone vapor stream 4 is removed from tank 1. Stream 4 is generated in situ within tank 1 and must be removed for recovery and eventual recycle to the process, as will appear infra.

In order to prevent settling of the solid urea component in tank 2, it will generally be preferable to provide a liquid-to-solids feed ratio of at least 4 to 1 (expressed as cc. acetone per gram of urea). It has also been determined that biuret extraction rate is improved if up to 5% water is present in stream 3. For best results, namely a balance of urea solubility verus biuret extraction rate, a water content of 3% in stream 3 is optimum. As will also appear from the data tables, infra, the biuret/urea ratio in saturated acetone varies inversely with temperature. Thus an operating temperature range of from 70° F. to 90° F. during extraction is preferable.

The final urea-acetone slurry is removed via 5 from tank 2. The liquid phase of stream 5 will be almost completely saturated with respect to both urea and biuret under normal operating circumstances, typically about 95% of theoretically complete saturation will be attained in practice. Stream 5 is now passed to centrifuge 6, or similar means for liquid-solids separation. The solid urea product, substantially free of acetone except for an occluded liquid coating on the particles, is passed via 7 to dryer 8. The solid urea is heated in dryer 8, preferably to a temperature in the range of 130° F. to 140° F., either by indirect external heating or by passing a hot gas stream through the dryer. Occluded liquid acetone is thus vaporized from the solid urea, and the product solid urea is passed via 9 to cooling means, not shown, and thereafter to bagging or bulk storage. It will be evident that heating of the urea in dryer 8 to higher temperature levels is quite undesirable and unnecessary. Although the dryer capacity would thus be greater, concomitant accelerated biuret formation would also take place.

A typical process sequence for recovery and recycle of acetone is also presented in FIGURE 1. Thus, referring to centrifuge 6, a liquid stream of acetone substantially saturated with urea and biuret is withdrawn via 10. Stream 10 is preferably divided, for reasons which will appear infra, into stream 11 which is directly recycled to urea treatment and stream 12 which is fully regenerated. The proportions of stream 11 and 12 may vary, however stream 11 will typically be 60% of stream 10. Stream 12 is passed into rectification tower 13, provided with heating coil 14. The acetone component of stream 12 is thus vaporized, and passes overhead from tower 13 as vapor stream 15. The vapor stream is cooled in condenser 16, provided with cooling coils 17. The resultant purified liquid acetone is withdrawn from condenser 16 via 18, and partially refluxed via 19. The balance of stream 18 passes via 20 to cooler 21, and is further cooled to the desired optimum temperature range of 70° F. to 90° F. prior to re-use in the process. The resultant cooled stream 22 is now combined with stream 11, and the combined stream 23 is passed via 3 to further urea treatment. Makeup acetone is added via 24.

It has been determined that, generally speaking, the limiting factor with respect to acetone-urea proportion in the process is the requirement that sufficient liquid be present to maintain a workable slurry. As mentioned supra, a ratio of about 4 to 1 is optimum. Thus, if completely fresh acetone is employed in the process, only a partial saturation with respect to biuret will take place at these proportions. It has also been determined that the rate of biuret extraction is not significantly diminished as the liquid solution becomes more saturated with respect to biuret. Therefore, it becomes feasible and economically preferable to provide a process sequence in which only a portion of the total acetone stream 10 used in the process is regenerated via 12. In effect, stream 11 thus merely recirculates through the system in order to provide the desired 4 to 1 ratio of liquid to solid during extraction. It will be evident that in treating urea with high biuret content, or if unit 2 can be operated in practice with a liquid-solids ratio below 4 to 1, it will become necessary or feasible to decrease or even eliminate stream 11, and fully regenerate all of stream 10 via 12.

Referring now to rectification tower 13, a liquid bottoms stream is withdrawn via 25. This bottom stream 25 consists essentially of an aqueous solution or melt of urea and biuret, and may either be discarded or recycled as feed to the main urea synthesis process for recovery of urea and concomitant conversion of biuret back to urea, which takes place under the urea synthesis conditions. As is customary in distillation practice, stream 25 may be passed in heat exchange with incoming stream 12, in order to preheat the feed stream 12 and reduce the total heat load on the tower.

In most cases, the temperature level in condenser 16 will be such that a small amount of acetone vapor remains uncondensed, and is withdrawn via 26. A hot acetone vapor stream is also withdrawn from dryer 8 via 27, and combined with stream 26. The resultant hot acetone vapor stream 28 is cooled in gas cooler 29, removed via 30 and combined with cool acetone vapor stream 4 derived from mix tank 2. The resultant vapor stream 31 is now passed into absorber 32 provided with packed section 33 or other gas-liquid contact means. Absorption liquid, which may be refrigerated acetone, water, or other suitable medium, is passed into absorber 33 via 34. Acetone vapor stream 31 is thus recovered in liquid stream 35, and is recycled to tower 13. Alternatively, stream 35 may be returned to the process via 24, if stream 34 consists of refrigerated acetone. Other suitable expedients will occur to those skilled in the art. Unabsorbed gas is vented from absorber 32 via 36.

The practicality and operating criteria for the design of a commercial facility employing the process of the present invention were established by a series of laboratory tests. In these tests, various physical forms of commercial solid urea were employed, including industrial size prills and microprills. Crushed prills were also tested, in order to establish the prospective performance of the process with material having high surface area per unit mass, such as crystalline urea. The tests were conducted on a batch scale. A weighed quantity of urea was mixed with a measured volume of solvent such as acetone, and the resulting slurry was agitated at a fixed temperature for a measured length of time. The solvent solution was acetone in most cases, such as where the prospective operating variables such as temperature were studied. In addition, as mentioned supra it was found that the decrease in extraction rate due to partial saturation was relatively minor, hence in many cases the solvent solution consisted partly of fresh acetone and partly of acetone previously saturated with respect to urea and biuret. Following are a series of data tables showing test results, followed in each case by a discussion and analysis of the particular test data.

indicated supra, it has been determined that up to 5% water content serves to improve the overall process efficiency, with 3% water content in the acetone solvent providing optimum results.

TABLE III

*Acetone Extraction of Biuret from Solid Prilled Urea Extraction Conditions*

| Test No. | Form of crude urea | Liquid solids ratio, cc./gm. | Percent saturated recycle liquid | Contact time (minutes) | Temp., °F. | Final percent biuret in area product | Orig. percent biuret in crude urea |
|---|---|---|---|---|---|---|---|
| (1) | (2) | (3) | (4) | (5) | (6) | (7) | (8) |
| 1 | Crushed prills. | 4 | 0 | 180 | 80 | 0.08 | 0.88 |
| 2 | do | 4 | 0 | 180 | 80 | 0.10 | 0.88 |
| 3 | do | 4 | 0 | 180 | 80 | 0.11 | 0.88 |
| 4 | do | 4 | 20 | 180 | 80 | 0.10 | 0.88 |
| 5 | do | 4 | 40 | 180 | 80 | 0.12 | 0.88 |
| 6 | do | 4 | 60 | 180 | 80 | 0.15 | 0.88 |
| 7 | do | 4 | 0 | 120 | 80 | 0.21 | 0.88 |
| 8 | do | 4 | 20 | 120 | 80 | 0.23 | 0.88 |
| 9 | do | 4 | 40 | 120 | 80 | 0.27 | 0.88 |
| 10 | do | 4 | 60 | 120 | 80 | 0.31 | 0.88 |
| 11 | do | 3 | 0 | 180 | 80 | 0.39 | 1.00 |
| 12 | Micro prills. | 3 | 60 | 10 | 80 | 0.23 | 1.2 |
| 13 | do | 2.5 | 60 | 10 | 80 | 0.25 | 1.2 |
| 14 | do | 2.5 | 0 | 5 | 80 | 0.32 | 1.2 |
| 15 | do | 4 | ¹ 60 | 15 | 90 | 0.21 | 1.2 |
| 16 | do | 4 | ¹ 60 | 10 | 90 | 0.23 | 1.2 |
| 17 | do | 4 | ¹ 60 | 5 | 90 | 0.26 | 1.2 |
| 18 | Whole prills. | 4 | ¹ 60 | 120 | 90 | 0.52 | 1.08 |
| 19 | do | 4 | 0 | 120 | 90 | 0.63 | 1.08 |
| 20 | do | 4 | 0 | 1,080 | 80 | 0.28 | 1.00 |
| 21 | do | 4 | 0 | 1,080 | 70 | 0.27 | 1.00 |

¹ Extraction solution included 2.94% water.

TABLE I

*Relative Solubilities of Biuret and Urea v. Temperature*

| Temp., °F. | Concentration of dissolved component in saturated acetone | | Concentration ratio, biuret/urea |
|---|---|---|---|
| | Grams biuret per 100 mls. acetone | Grams urea per 100 mls. acetone | |
| 80 | 0.84 | 0.46 | 1.8 |
| 110 | 0.62 | 0.75 | 0.83 |
| 125 | 0.61 | 0.78 | 0.78 |

Table I shows that the biuret/urea concentration ratio varies inversely with temperature, and in addition that the biuret concentration also varies inversely with temperature. Thus with all other factors constant it is apparent that lower temperatures would be more favorable. From a practical viewpoint, 70° F. to 90° F. is a preferable range due to such considerations as refrigeration requirements, etc.

TABLE II

*Relative Solubilities of Biuret and Urea vs. Water Concentration in Solvent*

| Solvent | | Concentration of dissolved solids in saturated solvent at 110° F. | | | Concentration ratio, biuret/urea |
|---|---|---|---|---|---|
| Mls. acetone | Mls. water | Grams biuret per 100 mls. solvent | Grams urea per 100 mls. solvent | Total dissolved solids per 100 mls. solvent | |
| 100 | 0 | 0.62 | 0.75 | 1.37 | 0.83 |
| 95 | 5 | 1.72 | 3.53 | 5.25 | 0.49 |
| 90 | 10 | 2.00 | 8.10 | 10.10 | 0.25 |

It is evident from Table II that a small concentration of water in the acetone results in a substantial increase in biuret solubility. However it is also apparent that the urea solubility also increases, and that the rate of increase in urea solubility is much greater. Thus, as Table III is a tabulation of test runs under varying process conditions, starting with runs in which maximum biuret extraction was achieved. Thus, runs #1–3 employed crushed prills (maximum surface area/unit mass), a relatively high (4 to 1) liquid-solids ratio, all fresh acetone (0% recycle), a long contact time of 180 minutes, and minimum test temperature (80° F.). As shown in column #7, the resultant urea product was very low in residual biuret content.

In runs #4–6, the percentage of recycle (saturated) acetone was raised, with only a small concomitant increase in residual biuret content. In runs #7–10, the contact time was reduced to 120 minutes, and in addition the amount of recycle acetone was varied from 0 to 60%. An increase in residual biuret is apparent. In run #11, the liquid/solids ratio was reduced to 3:1, with other test conditions at optimum. The difference between residual biuret in run #11 compared to runs #1–3 is quite substantial.

Starting with run #12, microprills were tested. The contact time was drastically reduced to 10 minutes, without producing any serious rise in residual biuret. In runs #13–14, the liquid/solids ratio and the contact time were successively reduced, without producing an unacceptable product. In the latter run (#14), all fresh acetone was employed. This may have served to balance out the concomitant reduction in both liquid/solids ratio and contact time. In runs #15–17, the effect of a minor concentration of water in the acetone was studied (see footnote, Table V). In addition, a higher test temperature was employed, together with a higher liquid/solids ratio of 4:1. Acceptable final levels of residual biuret were achieved.

Finally, whole prills were studied in runs #18–21. It will be appreciated that biuret extraction from whole prills is inherently more difficult, because of a lower surface area per unit mass of material. Thus, the results achieved in runs #18–19 were not especially favorable, compared to prior runs. It should be noted that run #18 employed 60% recycle acetone together with water (see footnote, Table V). The test result was more favorable than in run #19 which employed all fresh acetone, thus indicating further that the presence of a small amount of water in the solution is beneficial. Runs #20–21 were for an extended period, and served to established that whole prills may be brought to low levels of residual biuret by suitable selection of operating variables. Thus, all fresh acetone was employed in a 4:1 ratio. In addition, run #21 indicates that only slight improvement could be expected in the process of the present invention if refrigeration was provided to produce lower extraction temperatures.

TABLE IV

*Comparative Extraction with Various Solvents*

[Conditions: Crushed prills with 0.85% original biuret, extracted 25 gm. for 3 hrs. with 100 cc. fresh solvent @ 80° F.]

| Test No. | Solvent | Final percent biuret in urea product | Solubility of urea in solvent, gm./100 cc. |
|---|---|---|---|
| 1 | Acetone | 0.08 | 0.46 |
| 2 | Methyl ethyl ketone | 0.15 | 0.60 |
| 3 | Methyl propyl ketone | 0.30 | 2 |
| 4 | Ethyl ether | 0.83 | |
| 5 | Ethyl acetate | 0.69 | |
| 6 | Methyl acetate plus methanol | 0.46 | 12 |
| 7 | Methanol | | (¹) |
| 8 | Mixed esters (Amsco solvent 601) | 0.73 | 2.8 |

¹ Very soluble.

Table IV indicates the various drawbacks or shortcomings of other solvents, as well as the fact that other lower aliphatic ketones besides acetone are feasible for usage in the process of the present invention. Runs 1–3 demonstrate that the lower ketones through C–5 are suitable in the present invention. A limiting factor to the usage of ketones above C–5 is boiling point, since the boiling points of the higher ketones are close to or above the melting point of urea. Thus, removal of higher ketones without melting the solid urea would necessitate the provision of vacuum evaporation, which is not feasible from a practical point of view.

Runs #4, 5 and 8 demonstrate the ineffectiveness of other types of solvents, namely ethers and esters, with respect to biuret removal. Runs #6–7 show that methanol (and obviously homologous alcohols) are unsuitable due to high urea solubility. Other solvents such as acids, amines and aldehydes may be readily eliminated from consideration since these types of compounds may react or combine with urea.

The effectiveness of acetone treatment with respect to the reduction of the caking tendency of urea was also studied in detail. In this group of tests, reduction of caking tendency was measured on a comparative basis, with reference to untreated material. The particular sample of urea to be tested was placed in a drying tube and kept in an oven for 12 hours at 100° F. Then the urea was flushed free of residual vapor by passing 0.6 cubic foot of dry air at 100° F. through the tube. A standard amount of water vapor treatment was next applied to the urea, in order to produce a standard caking environment. This was done by passing 2 cubic feet of saturated air at 100° F. through the tube. Finally another 0.6 cubic foot of dry air was passed through the tube to flush out residual water vapor. All gases were passed through the tube at the rate of 1.2 cubic feet per hour. The length of urea which remained in the tube as caked material, after it was opened and inverted, was used as the measure of the caking tendency of the sample.

Table V infra shows the results of tests on urea prills, employing acetone as the surface-conditioning agent.

TABLE V

*Reduction of Urea Caking Tendency-Acetone Treatment*

| Test No. | Type of prill | Treatment conditions | | Inches of caked prills |
|---|---|---|---|---|
| | | Time (min.) | Temp. (° F.) | |
| 1 | Uncoated whole | No treatment | | 6.50–7.25 |
| 2 | Coated whole | No treatment | | 2.0 |
| 3 | Uncoated whole | 1 | 85 | 1.0 |
| 4 | do | 2 | 85 | 1.0 |
| 5 | do | 30 | 85 | 0.5 |
| 6 | do | 30 | 85 | ¹ 0.75 |
| 7 | do | 30 | 125 | 2.5 |
| 8 | do | 120 | 85 | 0.5 |
| 9 | Uncoated micro | No treatment | | 14.0 |
| 10 | do | 10 | 85 | 8.0 |
| 11 | do | 30 | 85 | 8.0 |

¹ Acetone initially saturated with urea and biuret.

From Table V, it is evident that even a very short interval of treatment with acetone produces surprisingly great improvement in the urea with respect to caking tendency. Run #1 establishes the standard caking tendency of the urea, without any treatment. In run #2, the urea was initially coated with a standard coating agent which is commercially employed to reduce the caking tendency of urea. Substantial improvement with respect to coating tendency is evident. In runs #3–5, uncoated urea was treated with acetone for varying lengths of time. It is evident that only a very short contact time is required for surface modification, resulting in substantial improvement in non-caking tendency. Thus, the urea in runs #3–4 had better non-caking properties than the commercial coated material of run #2, even with contact times of only 1 to 2 minutes. From run #6, it is evident that previously saturated acetone may be employed in the process, to achieve the desired surface modification. This shows that the surface modification is not the result of a net dissolving of urea from the prill surface. Instead, as will appear infra, this surface modification which leads to improved non-caking tendency, appears to be primarily a conversion of surface crystal type, from the initial prismatic columnar tetrahedron or needle-type crystals to final short and square crystals, which are regular in shape.

Runs #7 and 8 show the results of conditioning at higher temperature and for longer treatment times respectively. Thus, it is evident from run #7 that a higher conditioning temperature does not improve the process. With reference to run #8, no improvement was obtained by 120 minutes treatment, as compared to the 30 minutes' treatment of run #5. This further indicates that the conditioning treatment is primarily a surface modification rather than a physical alteration of the entire prill. Runs #9–11 were tests on microprills, a form of urea which has considerably higher cake tendency than ordinary prills. Conditioning of microprills in accordance with the present invention also resulted in substantial improvement in non-caking tendency, as evidenced by runs #10 and 11.

TABLE VI

*Urea Caking Tendency—Treatment with Various Solvents*

[Conditions: Uncoated whole prills treated for 30 minutes @ 85° F., original caking tendency 6.5–7.25 inches]

Solvent: Inches, caked prills
    Acetone _____ 0.5.
    Methyl propyl ketone _____ 0.75.
    Ethyl ether _____ 6.0.
    Ethyl acetate _____ 6.75.
    Methyl acetate _____ Unsuitable.
    Methanol _____ Unsuitable.

As shown by the results of Table VI supra, other lower aliphatic ketones are suitable for usage in accordance with the surface conditioning aspect of the present invention. It is evident that other solvents are not suitable, either because an insignificant reduction in caking tendency is achieved or because the particular solvent could not be removed from the urea after the conditioning treatment. In these cases, heating of the urea after treatment caused the urea to partially dissolve in residual solvent which caused caking.

The surface conditioning aspect of the present invention is further shown by microscopic examination of actual prills before and after acetone treatment. The modification of surface texture and crystal structure is clearly evident. Thus, the original crystal form of the urea, namely prismatic columnar tetrahedron, has been modified to shorter, more regular crystals. In actual appearance, untreated prills are smooth, hard and pearly in form. Treated prills are textured, with a powdery surface, and have a dull unglazed appearance. It is possible that the conditioning treatment is effective to some extent because surface crystal stresses are relieved by the temporary absorption of solvent. Thus, the treated prills would tend to have a more stable and coherent surface layer of crystals due to re-orientation and attainment of surface equilibrium.

It will be readily appreciated that the process of the present invention may be employed to achieve a separation between urea and biuret in instances where a substantial proportion of biuret is present. Thus, for example, biuret itself is prepared from urea for certain specialized usages by heating the urea under controlled conditions so as to avoid byproduct formation. Usually a considerable amount of unconverted urea is present in the product biuret. The process of the present invention could readily be adapted to achieve a separation of the product biuret from unconverted urea.

We claim:

1. Process for producing an improved solid urea product with reduced biuret content and caking tendency which comprises mixing crude solid urea with a liquid solvent comprising acetone together with about 3% water content in a liquid to solids ratio of at least about 4 to 1, maintaining said urea in agitated contact with said solvent at a temperature in the range of 70° F. to 90° F. whereby biuret is extracted into the liquid phase, separating solid urea of reduced biuret content from the biuret-laden solvent, heating the purified solid urea to a temperature of about 130° F. to 140° F. to vaporize occluded liquid solvent, and cooling the resulting solid urea product.

2. Process for producing an improved solid urea product having substantially reduced biuret content which comprises mixing crude solid urea with a liquid solvent containing water in an effective amount in solution with an organic liquid selected from the group consisting of acetone, methyl ethyl ketone, methyl propyl ketone and diethyl ketone, said liquid solvent containing up to 5% water content whereby biuret solubility in said liquid solvent is increased, maintaining said urea in agitated contact with said solvent whereby biuret is extracted into the liquid phase, separating solid urea of reduced biuret content from the biuret-laden liquid solvent, heating the purified solid urea to vaporize occluded liquid solvent, and cooling the resulting solid urea product.

3. Process of claim 2, in which said liquid solvent contains a substantial concentration of dissolved urea in solution, prior to being mixed with crude solid urea.

4. Process of claim 2, in which the water content in said liquid solvent is about 3%.

References Cited in the file of this patent

UNITED STATES PATENTS

| | | |
|---|---|---|
| 1,584,875 | Lidholm | May 18, 1926 |
| 2,663,731 | Michehtch | Dec. 22, 1953 |
| 3,025,571 | Beecher et al. | Mar. 20, 1962 |

OTHER REFERENCES

Rigamonti et al.: Chem. Abstracts, vol. 52 (1958), col. 4967f (abstract of Riv. Combustibili, vol. 11 (1957), pp. 553–67).

Rigamonti et al.: Chem. Abstracts, vol. 54 (1960), col. 16,873 (abstract of Fette, Seifen, Anstrichmittel, vol. 61 (1959), pp. 864–7).